(12) United States Patent
Lohumi et al.

(10) Patent No.: US 11,748,785 B2
(45) Date of Patent: Sep. 5, 2023

(54) METHOD AND SYSTEM FOR ANALYZING LIVE BROADCAST VIDEO CONTENT WITH A MACHINE LEARNING MODEL IMPLEMENTING DEEP NEURAL NETWORKS TO QUANTIFY SCREEN TIME OF DISPLAYED BRANDS TO THE VIEWER

(71) Applicant: SLING MEDIA PVT LTD, Bangaluru (IN)

(72) Inventors: Avinash Chandra Lohumi, Ghaziabad Uttar Pradesh (IN); Arun Lokman Gangotri, Bangalore (IN)

(73) Assignee: DISH Network Technologies India Private Limited

( * ) Notice: Subject to any disclaimer, the term of this patent is extended or adjusted under 35 U.S.C. 154(b) by 513 days.

(21) Appl. No.: 16/720,708

(22) Filed: Dec. 19, 2019

(65) Prior Publication Data
US 2021/0195286 A1    Jun. 24, 2021

(51) Int. Cl.
*G06V 10/44* (2022.01)
*G06V 10/764* (2022.01)
(Continued)

(52) U.S. Cl.
CPC ....... *G06Q 30/0272* (2013.01); *G06F 18/211* (2023.01); *G06F 18/214* (2023.01); *G06F 18/2411* (2023.01); *G06F 18/2451* (2023.01); *G06V 10/454* (2022.01); *G06V 10/764* (2022.01); *G06V 10/82* (2022.01); *G06V 20/41* (2022.01); *G06V 20/46* (2022.01); *H04N 21/44008* (2013.01); *H04N 21/44204* (2013.01);
(Continued)

(58) Field of Classification Search
None
See application file for complete search history.

(56) References Cited

U.S. PATENT DOCUMENTS 10,007,863 B1 * 6/2018 Pereira ................ G06V 10/764
10,699,488 B1 * 6/2020 Terrano ................ G06N 20/00
(Continued)

FOREIGN PATENT DOCUMENTS

CN  109767386 A * 5/2019
CN  110148007 A * 8/2019
(Continued)

*Primary Examiner* — Mohammed Rachedine
(74) *Attorney, Agent, or Firm* — KW Law, LLP (57) ABSTRACT

A method for brand recognition in video by implementing a brand recognition application coupled to a streaming media player, for identifying an observed set of brands streamed in a broadcast video; receiving, by the brand recognition application, a broadcast video stream of a series of images contained in consecutive frames about an object of interest; extracting a set of brand features from each of image received by applying a trained brand recognition model with neural networks in order to detect one or more features related to each displayed object of interest in each frame, wherein the object of interest is associated with a brand image contained video content displayed to a viewer; and displaying, by a graphic user interface, information from the brand recognition application comprising at least time detected of the brand image in the video content of the broadcast video.

20 Claims, 6 Drawing Sheets

(51) Int. Cl.
 G06V 10/82 (2022.01)
 G06V 20/40 (2022.01)
 H04N 21/44 (2011.01)
 H04N 21/442 (2011.01)
 H04N 21/81 (2011.01)
 H04N 21/234 (2011.01)
 G06Q 30/0272 (2023.01)
 G06F 18/211 (2023.01)
 G06F 18/214 (2023.01)
 G06F 18/2411 (2023.01)
 G06F 18/2451 (2023.01)

(52) U.S. Cl.
 CPC ....... H04N 21/812 (2013.01); *G06V 2201/09* (2022.01)

(56) References Cited

U.S. PATENT DOCUMENTS

| | | | | |
|---|---|---|---|---|
| 2014/0282671 A1* | 9/2014 | McMillan | ........ | H04N 21/44213 725/19 |
| 2019/0313154 A1* | 10/2019 | Baughman | ....... | H04N 21/44226 |
| 2020/0057914 A1* | 2/2020 | Hintz | ...................... | G06F 18/22 |
| 2020/0134377 A1* | 4/2020 | Attorre | ................. | G06V 10/82 |

FOREIGN PATENT DOCUMENTS

| | | | | |
|---|---|---|---|---|
| CN | 110633289 A | * | 12/2019 | |
| CN | 110837829 A | * | 2/2020 | .............. A47L 11/24 |

\* cited by examiner

METHOD AND SYSTEM FOR ANALYZING LIVE BROADCAST VIDEO CONTENT WITH A MACHINE LEARNING MODEL IMPLEMENTING DEEP NEURAL NETWORKS TO QUANTIFY SCREEN TIME OF DISPLAYED BRANDS TO THE VIEWER

TECHNICAL FIELD

The present invention generally relates to brand detection in live broadcasted or streamed video content and more particularly to a method and system for content brand recognition by implementing a trained machine learning model to track screen time of extracted image properties from brands in the content displayed to the viewer user by image classification using deep learning neural network applications.

BACKGROUND

When receiving broadcasts of stadium sporting events, it is common place by viewers watching the sporting event remotely on a display device to view advertising of products that are displayed in the content of the broadcast sporting event such as advertising banners that are found around the playing field in the sports stadium and are visible to the viewing audience. That is, the viewing audience when watching a sporting event depending on the camera angle may see portions or the entirety of a banner ad in the sports stadium in the video content presented to them along with the player action.

In general, a viewer may recall at least some of some these ads which are either completely displayed (i.e. the entire banner is prominently shown on the viewer's screen) or parts of the banner are presented on the screen along with the sports action. Further, because of the captive situation created by a live sporting event (or other live event) at the stadium, exposure of various brands in banners in the presented video content can have an indirect affect on each viewer's purchasing habits. However, even with the captive environment present, most viewers do not retain significant lasting memory of products and services displayed by the banner advertisement in the video content because it is not the audience focus; the sporting event is the viewer's focus, and this is where the viewer's attention is drawn.

Therefore, for advertisers what is considered of significant factor for memory retention and to gauge the value of each banner or brand advertisement is the frequency and time of exposure to the viewer of the advertised message.

Hence, the ability to quantify the display of banner advertisement viewed in streamed video content can play a role in making a case for higher dollar values to customers by not only banner locations but by the quantified display time of the banner advertisement shown in a live broadcasted event (e.g. a sports game).

Current systems require significant training and testing, and also fail to address robustly the frequency of brands displayed in video content of live streamed broadcasts (i.e. sports events) and to quantify the exposure by viewers of displayed advertised brands captured in the broadcast video content from the sporting venue.

Hence, it is desirable to address these inadequacies of tracking displayed brands which are captured in live sporting broadcast content and displayed to a viewing audience (via a streamed service) by providing a method and system for recognizing the advertised brands in the video content by implementing deep learning neural networks to classify images extracted from the broadcast video in order to determine screen time of each selected brands displayed to viewers. The present disclosure addresses at least this need.

BRIEF SUMMARY

A method and system are provided for improving brand recognition to determine screen time of brands displayed in objects in broadcasted video content by extracting image properties from selected brands displayed in video streams to the viewer.

In an exemplary embodiment, a method for brand recognition in video is provided. The method includes: implementing a brand recognition application coupled to a streaming media player, for identifying an observed set of brands streamed in a broadcast video; receiving, by the brand recognition application, a broadcast video stream of a series of images contained in consecutive frames about an object of interest; extracting a set of brand features from each of image received by applying a trained brand recognition model with neural networks in order to detect one or more features related to each displayed object of interest in each frame, wherein the object of interest is associated with a brand image contained video content displayed to a viewer; and displaying, by a graphic user interface, information from the brand recognition application including at least time detected of a brand image in the video content of the broadcast video.

In various exemplary embodiments, the method includes: the brand recognition application further including: performing one or more processing steps, by the brand recognition application, in implementing the trained brand recognition model including: applying a feature extraction using a trained neural network including a convolutional neural network (CNN) to classify one or more features in each image; applying a tensor mapping to each classify one or more features in a feature map; and applying a region proposal for one or more regions covering the object of interest in each image to define one or more bounded regions of interest. The method further including identifying, by the brand recognition application, a foreground and a background for each region of the one or more regions based on the feature map for feature classification of features related to the object of interest of the selected brand image. The method of further including: applying, by the brand recognition application, a region of interest pooling layer (ROIP) to obtain a fixed vector representation in each region of interest to determine an identified feature in the image related to a selected brand. The method further including: applying, by the brand recognition application, a region convolutional neural network (R-CNN) to the region of interest to determine a location of the selected brand based on a stored set of brands classified by a trained CNN for brand recognition. The method further including: training, by the brand recognition application, the trained brand recognition model by: receiving a training set of one or more images in a training broadcast video stream including brand images with features in one or more frames associated with objects of brands; and tagging features in one or more brand images of brand objects received in each frame of the training broadcast video stream to create a feature set for mapping each feature into a CNN for producing a trained CNN. The method further including: extracting one or more features using a trained CNN and applying the tensor mapping to classify each feature in the trained brand recognition model; and training one or more region proposal based on a set of classified features received in the training broadcast video stream. The method further including: displaying, by the graphic user interface, information from the brand recognition including types of brands tracked, categories of brands, and number of times displayed to the viewer. The method further including: extracting images feature by feature in a live video broadcast using a trained CNN model for quantifying visual notice of object of interest in a video session.

In another exemplary embodiment, a computer program product tangibly embodied in a computer-readable storage device and including instructions that when executed by a processor perform a method for brand recognition for quantifying brand advertising value of products displayed in video content to a viewer is provided. The method includes: implementing a brand recognition application coupled to a streaming media player, for identifying an observed set of brands streamed in a broadcast video; receiving, by the brand recognition application, a broadcast video stream of a series of images contained in consecutive frames about an object of interest; extracting a set of brand features from each of image received by applying a trained brand recognition model with neural networks in order to detect one or more features related to each displayed object of interest in each frame, wherein the object of interest is associated with a brand image contained video content displayed to a viewer; and displaying, by a graphic user interface, information from the brand recognition application including at least time detected of a brand image in the video content of the broadcast video.

In various exemplary embodiments, the brand recognition application further includes performing one or more processing steps, by the brand recognition application, in implementing the trained brand recognition model including: applying a feature extraction using a trained neural network including a convolutional neural network (CNN) to classify one or more features in each image; applying a tensor mapping to each classify one or more features in a feature map; and applying a region proposal for one or more regions covering the object of interest in each image to define one or more bounded regions of interest.

The method further including: identifying, by the brand recognition application, a foreground and a background for each region of the one or more regions based on the feature map for feature classification of features related to the object of interest of the selected brand image. The method further including: applying, by the brand recognition application, a region of interest pooling layer (ROIP) to obtain a fixed vector representation in each region of interest to determine an identified feature in the image related to a selected brand. The method further including applying, by the brand recognition application, a region convolutional neural network (R-CNN) to the region of interest to determine a location of the selected brand based on a stored set of brands classified by a trained CNN for brand recognition. The method further including: training, by the brand recognition application, the trained brand recognition model by: receiving a training set of one or more images in a training broadcast video stream including brand images with features in one or more frames associated with objects of brands; and tagging features in one or more brand images of brand objects received in each frame of the training broadcast video stream to create a feature set for mapping each feature into a CNN for producing a trained CNN. The method further including: extracting one or more features using a trained CNN and applying the tensor mapping to classify each feature in the trained brand recognition model; and training one or more region proposal based on a set of classified features received in the training broadcast video stream. The method of claim 16, further including: displaying, by the graphic user interface, information from the brand recognition including types of brands tracked, categories of brands, and number of times displayed to the viewer.

In yet another exemplary embodiment, a method of operating a cloud-based brand recognition system is provided. The method includes: implementing a brand recognition application hosted on a server and coupled to a streaming media player, for identifying an observed set of brands streamed in a broadcast video; receiving, by the brand recognition application, a broadcast video stream of a series of images contained in consecutive frames about an object of interest; extracting a set of brand features from each of image received by applying a trained brand recognition model with neural networks in order to detect one or more features related to each displayed object of interest in each frame, wherein the object of interest is associated with a brand image contained video content displayed to a viewer; and displaying, by a graphic user interface, information from the brand recognition application including at least time detected of a brand image in the video content of the broadcast video.

In various exemplary embodiments, the method further including: performing one or more processing steps, by the brand recognition application, in implementing the trained brand recognition model wherein the trained brand recognition model being hosted on the server, including: applying a feature extraction using a trained neural network including a convolutional neural network (CNN) to classify one or more features in each image; applying a tensor mapping to each classify one or more features in a feature map; and applying a region proposal for one or more regions covering the object of interest in each image to define one or more bounded regions of interest. The method further including: training, by the brand recognition application, the trained brand recognition model by: receiving a training set of one or more images in a training broadcast video stream including brand images with features in one or more frames associated with objects of brands; and tagging features in one or more brand images of brand objects received in each frame of the training broadcast video stream to create a feature set for mapping each feature into a CNN for producing a trained CNN.

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

The process of image recognition for tracking object of interest such as banner advertised captured in live streamed video is often processer intensive fraught with obstacles that include creating large data sets for training models to object detection. This in turn leads to latency and bandwidth obstacles, as well as cost issues causing drawbacks and preventing widespread adoption in subscriber services by set-top box (STB) service providers. By utilizing artificial intelligence (AI) and machine learning (ML) techniques such as a Deep Neural Network, the image recognition can be made faster and can be more robustly performed overcoming present drawbacks faced and making a case for the feasible implementation of such brand recognition applications to the STB service providers.

For example, large amount of individualized training data which is often required for an image recognition training and testing model is reduced. By implementing the training using a Convolutional Neural Network (CNN), a type of Deep Learning Neural Network developed for image and video processing, the image recognition can be made more quickly performed and better trained models can be developed. Hence, the steps of receiving an input image, assigning an importance (learnable weights and biases) to various objects in the image and differentiating one from the other can be performed in part using trained machine learning models that result in less processor usage and costs.

Figure 1:
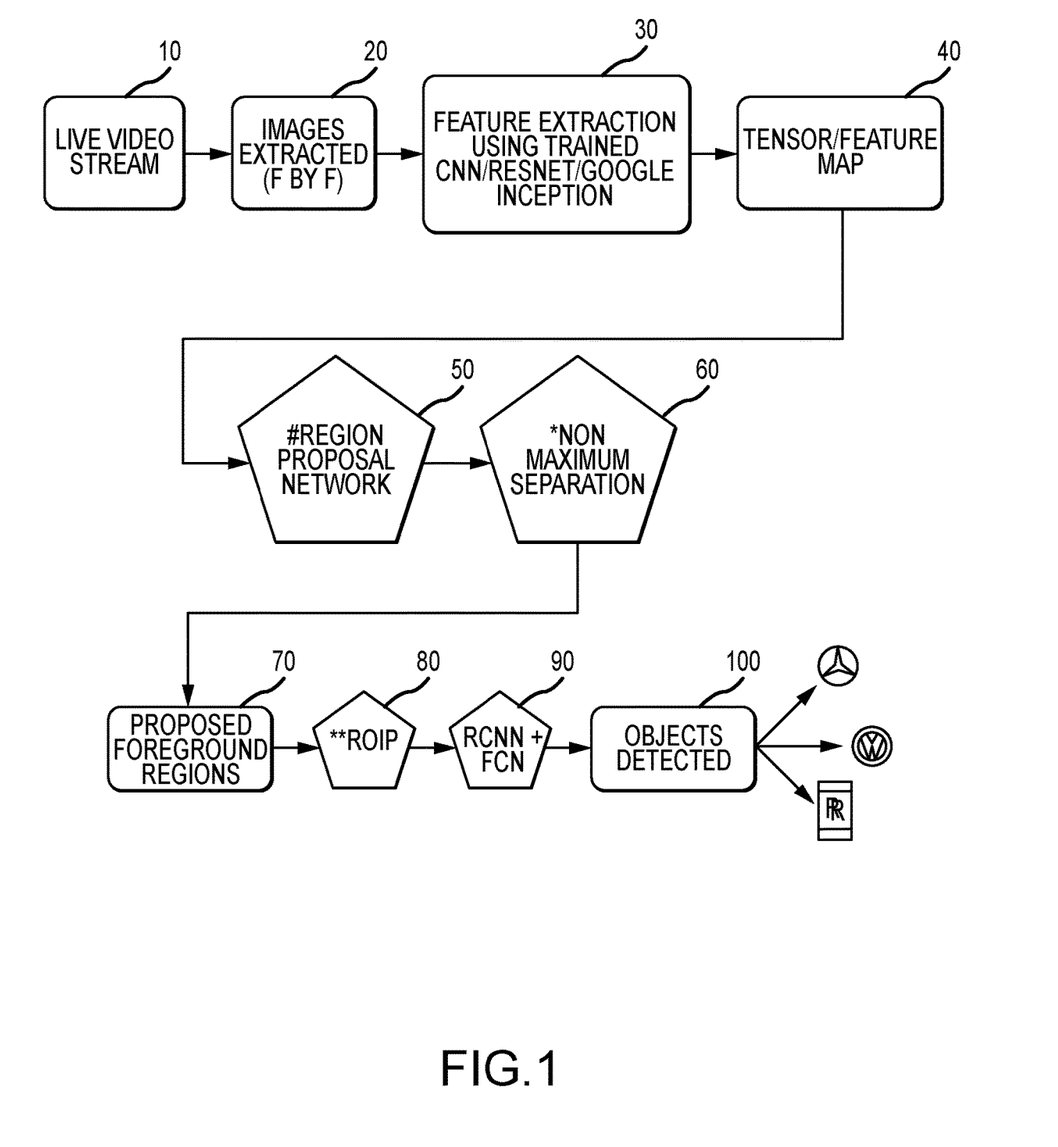
FIG. 1 illustrates an exemplary diagram for a brand recognition system to determine screen time by extracting image properties using deep learning Neural Network applications from selected brands displayed in broadcast content to the viewer in accordance in accordance with the exemplary embodiments described herein.

A video is a multidimensional digital signal organized as a stream of still images, called frames, as depicted in FIG. 1. In this framework, a monochrome frame is represented as a 2D tensor, a color frame as a 3D tensor, and so on. Thus, these are called tensor frames. Content of frames changes in time-giving impression of smooth motion to the observer. On the other hand, consecutive frames that contain similar content are grouped together and form the so-called session or sample video content broadcasts. Finally, a set of consecutive shots with semantically similar content is called a scene.

In R-CNN, the image is first divided into any number of regions and a weighting factor is applied to each region when the CNN (ConvNet) is applied for each region respectively. The size of the regions is determined, and the correct region is inserted into the artificial neural network. Because, each region in the picture is applied CNN separately, training time is reduced.

In the various exemplary embodiment, the present disclosure describes systems and methods implementing a brand recognition application using (CNN/R-CNN) neural networks that tracks the time displayed of user selected brands in live broadcast streamed content of sporting events or the like.

In the various exemplary embodiment, the present disclosure describes systems and methods implementing a brand recognition application that enables quantifying the time displayed of user of advertising banners of brands displayed in content of live or recorded broadcast streams of sporting events or the like.

In various exemplary embodiments, the present disclosure describes reduced unsupervised training to create a trained model by using deep neural networks to classify extracted images from streamed video associated of frames of live or recorded broadcast video, and for reporting to various customers, the time displayed of one or more selected brands displayed without affecting the latency of the live broadcast video stream to the viewer via a set-top-box or the like. While the content is described as received in a live broadcast video stream, it is contemplated that the brand recognition application is applicable to recorded placeshifted streamed video or the like.

The present disclosure provides a brand recognition system that implements a machine learning (ML) application to train a model for a large labeled dataset of images with brand category labels (e.g. FORD®, VERIZON®, etc.). The brand recognition application employs a two-step process of training a model by implementing the ML solution to create a trained model that contains brand features extracted from brand samples and classifies objects of interest in accordance with labels of various brand classes to quantify time viewed or each object type.

FIG. 1 illustrates an exemplary diagram for implementing a machine learning training and predicting model of the brand recognition system in accordance with an embodiment. In FIG. 1, at block 10, a live video stream is received by the brand recognition server connected to a set-top-box (described in detail in FIG. 6). The live video stream consists of a set of images where each image is a frame and a consecutive series of image frames defines a sample video stream. At block 20, the images are extracted on a frame by frame basis for further semantic segmentation processing. The larger the available pipeline of images input to the brand recognition system, the larger the data set can be used training the feature classification model. At block 30, the features extracted are trained using a CNN inception deep convolution architecture. That is, the features on an image in a frame are automatically masked and labeled. The larger the image set, the more features and hence the labeling perform. In various exemplary embodiments, the an image label datastore can be created with pixel level labeling used for training and testing the model developed.

In various exemplary embodiments, the feature extraction solution of block 30 can use GOOGLE® INCEPTION which is a type of deep convolutional architecture with multiple levels of factorization for efficient processing of the neural network. At block 40, a tensor or feature map is implemented based on the features extracted. The tensor mapping is also highly efficient as the mapping process prevents partition of replica feature data when the feature data set is mapped to a created tensor data set. The tensor feature map separates the features for further classification. The tensor can be passed through a single filter with pooling and Relu. The resulting 2D tensor will contain areas of higher values.

At block 50 the region segmentation is proposed (i.e. a number of regions are proposed for the network). In various exemplary embodiment, a default number may be provisioned for a certain number of regions in each frame. Alternately, a user may select the number or select an optimum number for the region proposal by training the network.

At block 60, the non-maximum separation is determined for integrity of each brand determination. This can be determined by empirical testing to prevent interference between regions. Further, the regional interference can be minimized by keeping only one anchor box per object.

At block 70, the proposed foreground regions are identified for each image corresponding to regions of preselected levels or other determined levels of pixel values. In various embodiments, the anchors or bounding boxes around the higher pixel values will be created for corresponding regions in the image which will be later passed through FCN with SoftMax/Sigmoid activation function for object detection. At block 80, the Region of Interest Pooling (ROIP) is performed for use at block 90, to input to the R-CNN model. The convolutional neural network (CNN) is mainly for image classification. While an R-CNN, with the R standing for region, is for object detection. The CNN can be used to determine the class of an object but not where the object is located on the screen. Further, If multiple objects are in the visual field then the CNN bounding box regression cannot work well due to interference. In R-CNN the CNN is forced to focus on a single region at a time to minimize interference (defined by the non-maxim separation block 60) as only a single object of interest will dominate the single region. The regions in the R-CNN are detected by selective search algorithm from the region proposal network at block 50. followed by resizing so that the regions are of equal size before sent to a CNN for classification and bounding box regression.

The R-CNN model computes a set of features for identifying the object of interest. The R-CNN model may use a selective search application to extract a large quantity of object proposals and then computes CNN features for each object proposal to classify each region. In alternative embodiments, the R-CNN model can classify each region using a class-specific linear SVMs and further the R-CNN can be built on top of any CNN structures, such as AlexNet, VGG, GoogLeNet, and ResNet.

At block 100, the corresponding regions in the image are passed through FCN with SoftMax/Sigmoid activation function for object detection. The Fully Convolutional Network (FCN) learns a mapping from pixels to pixels, without extracting the region proposals. The FCN network pipeline is an extension of the CNN. The FCN allows the CNN to receive input arbitrary-sized images. The restriction of CNNs to accept and produce labels only for specific sized inputs comes from the fully-connected layers which are fixed. Contrary to them, FCNs only have convolutional and pooling layers which give them the ability to make predictions on arbitrary-sized inputs.

Figure 2:
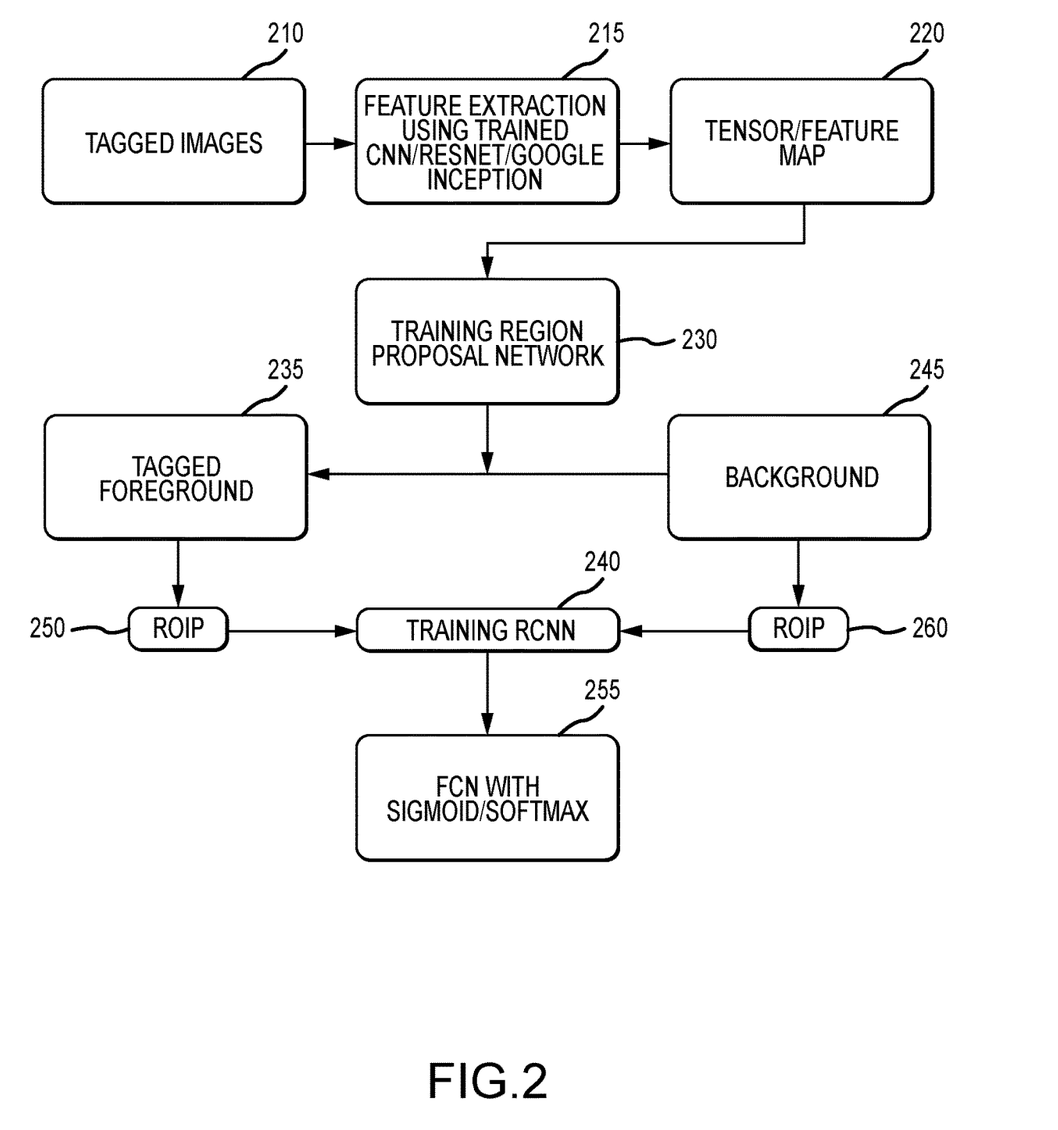
FIG. 2 illustrates an exemplary diagram for a brand recognition system to determine screen time by extracting image properties using deep learning Neural Network applications from selected brands displayed in broadcast content to the viewer in accordance with the exemplary embodiments described herein.

In FIG. 2, illustrates an exemplary diagram of a training architecture of the machine learning model in accordance with an embodiment. In FIG. 2, at an input module 210 a video containing a set of images is received. The images are tagged for further analysis. The tagging may occur for each consecutive image, every other image, or in any manner that is desired or can be buffered so as to not cause any latency in the processing of each image. The feature extraction module 215 extracts using trained CNN which can be implemented using a RESNET for classification such form GOOGLE® INCEPTION™. The GOOGLE® INCEPTION™ can be implemented with image factorization in smaller convolutions for efficiency. This is because the convolutions with larger spatial filters (e.g. 5×5 or 7×7) tend to be disproportionally expensive in terms of computation.

Next, at the tensor and feature map processing module 220, the images extracted from the video the images the object of interest images containing the object of interest are g passed through filters (matrix with randomly initialized weights) thereby creating a tensor of depth (filter numbers).

At the training region proposal module 230, the training of the RPN and the training of the R-CNN at the training RCNN module 240 are performed at once. The training region proposal module 230 classifies the training region between a foreground and a background. The foreground classified data is sent to the foreground processing module 235 of tagging the foreground image. The background data is sent to the background processing module 245 for tagging the background image. The Region of Interest Pooling (ROIP) module 250 receives the tagged foreground image and creates multiple anchor boxes of varied dimensions on top of the user tagged object of interest. The multiple anchor boxes (i.e. objects in the ROIP) is sent to the training R-CNN module 240. Likewise, in parallel, the background tagged image is sent by the background processing module 245 to the ROIP module 260 for training the RCNN by the R-CNN training module 240. At the fully convolution network (FCN) with pooled layer produces a segmentation map with Sigmoid and SoftMax module, the intersection over union is determined between the foreground and the background image. The FCN is based on the intersection of GT and Anchor box area/union of GT and anchor box area. If the determined value is greater than 0.5, the result is considered a foreground image, if the value is less than 0.1, the result is considered a background image.

Figure 3A:
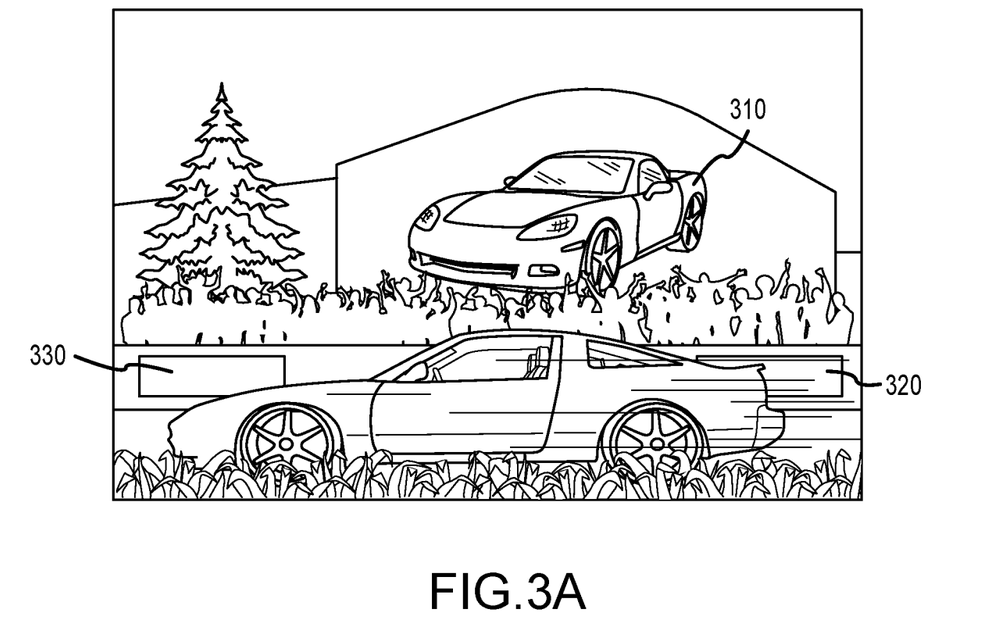
FIGS. 3A and 3B illustrate exemplary screenshots of images with tracked brands using the brand recognition system for tracking brand recognition screen time by extracting image properties using deep learning Neural Network applications from selected brands displayed in broadcast video content to the viewer in accordance with the exemplary embodiments described herein.
Figure 3B:
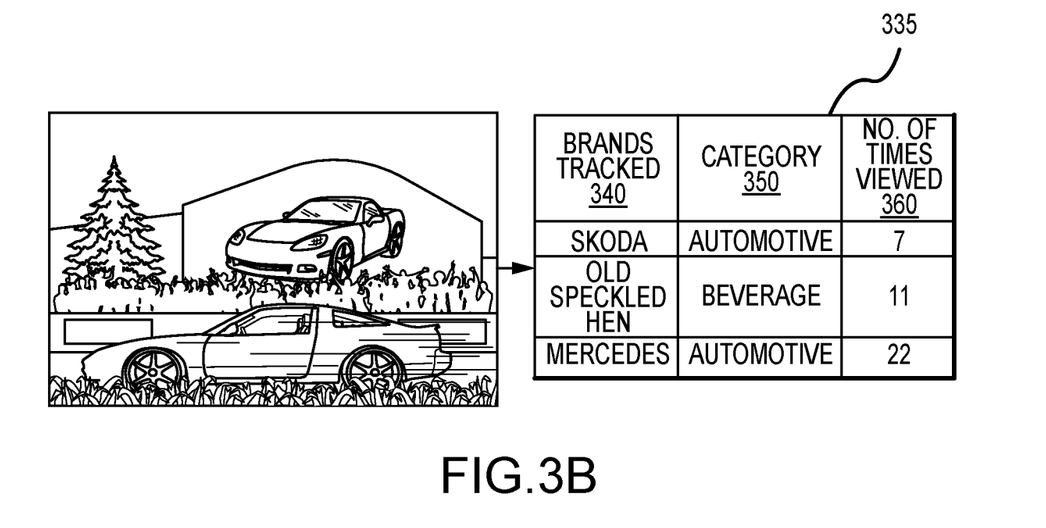

FIGS. 3A and 3B illustrate exemplary screen shots of frames of images with the brands identified on the screen by the brand recognition system in accordance with an embodiment. In FIG. 3A, at 310, the pre-trained ML model identifies the logo. At 320, a particular brand is identified (e.g.

the "SKODA" brand) by the brand recognition system. At 330, another brand is observed, the "Beer" brand by the brand recognition system.

Figure 6:
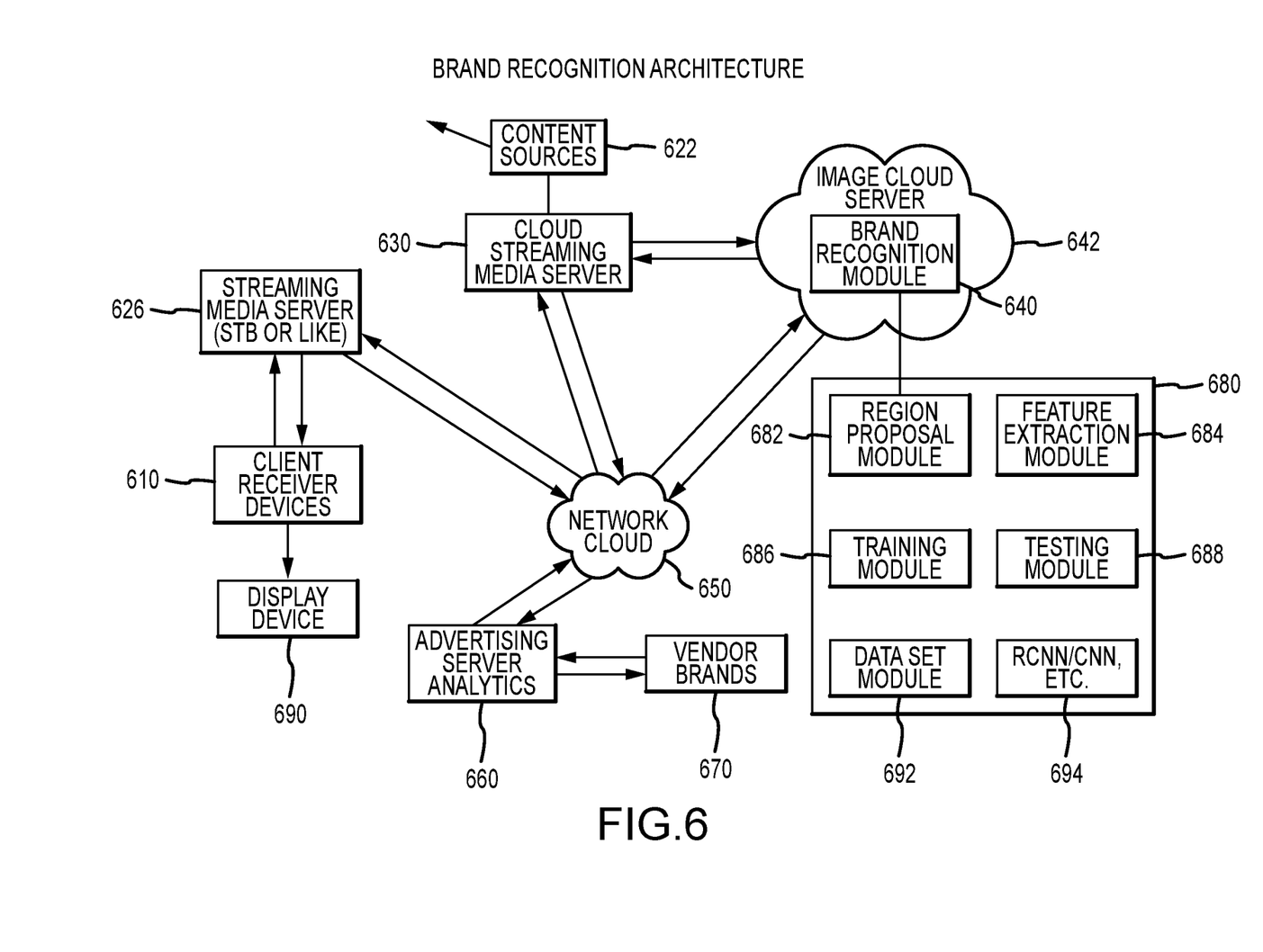
FIG. 6 illustrates an exemplary flowchart of a brand recognition system to determine screen time by extracting image properties using deep learning Neural Network applications from selected brands displayed in broadcast content to the viewer in accordance with the exemplary embodiments described herein.

In FIG. 3B, the screenshot is included with a table 335 that illustrates an exemplary report of results (e.g. from the advertising analytic engine in the advertising analytics server 660 of FIG. 6) of analytical data from the brand recognition system. That is, the table 335 displays various brands recognized which are tracked 340, categorized 352 into categories such as "automotive", "beverage" etc. and displays analytics of timed views are displayed in the column "No. of times viewed" 360.

Figure 4:
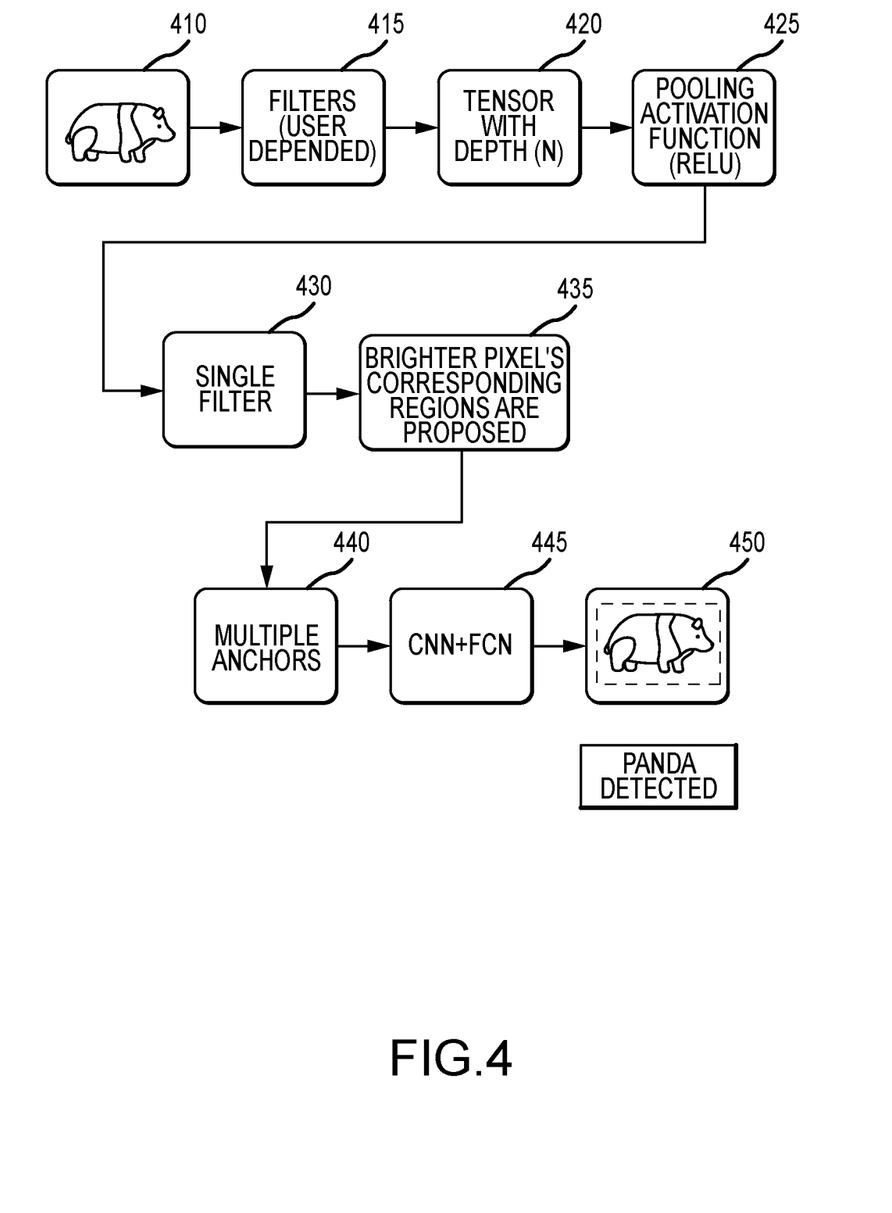
FIG. 4 illustrates an exemplary block diagram for a brand recognition system to track brand screen time by extracting image properties using deep learning Neural Network applications from selected brands displayed in broadcast video content to the viewer in accordance with the exemplary embodiments described herein.

FIG. 4 is a flow diagram of the brand recognition application in accordance with an embodiment. The processing step required in a CNN is much lower as compared to other classification algorithms. In FIG. 4, an object of interest at step 410 is selected. At 415 filtering of the image is applied to remove noise and is user depended. At 420, a tensor mapping with a depth (n) is applied for a set of features related to the image. At step 425, pooling and activation functions (relu) are applied to the tensors created. At 430, filtering is applied for aiding in determining brighter regions of the image (i.e. a brighter set of pixels) for bounding to generate a region proposal. At 440, multiple anchors are used for a set of bounded regions to prevent interference between each region. At step 445, At This type of network is composed of four layers. In the convolution layer, the filter is used as a navigator over the image.

In FIG. 4, at an input step 410, a brand is selected from input from a vendor. In this case, the brand is an object or interest. The image in a frame that is received, is filtered at step 415 for fine grain recognition, for removing a background context and for focusing on the object of interest. The object recognition can also be configured dependent on parameters associated with the user (i.e. the brand vendor requirements). At 420, a tensor with depth (n) for a feature extraction is applied. At step 425, a pooling and activation function (i.e. relu function) is applied. At step 430 a single filter is applied.

In various embodiments, at step 430m the single filter hovers over an image and makes calculations on the pixels of the spot where the filter is located, making each pixel in that pixel a pixel in the new image. This in turn generates a called feature map. Also, multiple filters can be used in a CNN network, and the accessed feature map is shaped according to the property in the filter.

At step 435, brighter pixels corresponding to a region are classified and localized on the image. At step 440, multiple anchors for iterative evaluating parts of bounded (or anchored) boxes on the image are proposed. At step 445, a supervised search implementing a CNN with FCN is implemented for feature detection by pattern matching via the neural network to identify the objection of interest. In various embodiments, a Relu layer may follow the convolution layer and the Relu activation function is used to set the negative values in the incoming data to 0. In a pooling Layer, pooling is done with the feature maps size reduction method.

Figure 5:
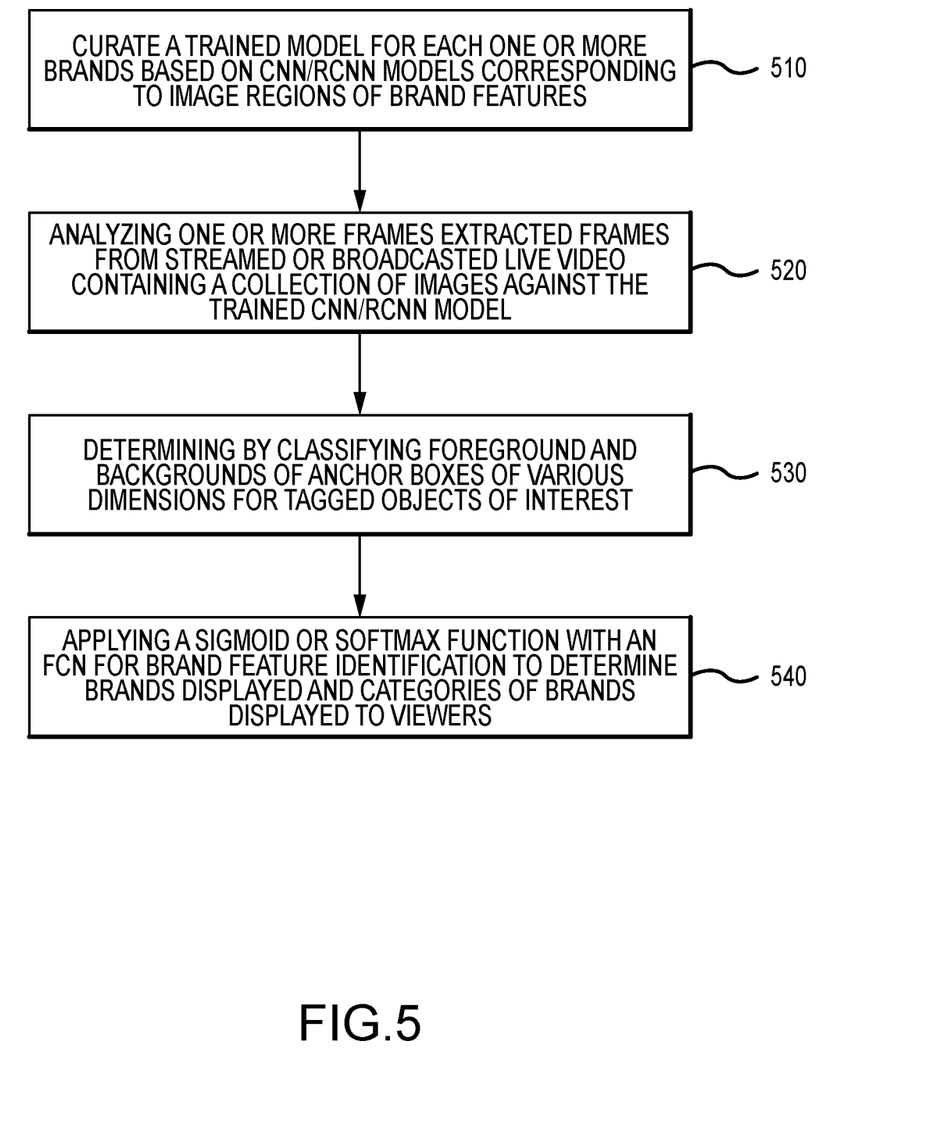
FIG. 5 illustrates an exemplary flowchart of a brand recognition system to track screen time by extracting image properties from selected brands using deep learning Neural Network applications displayed in broadcast video content to the viewer in accordance with the exemplary embodiments described herein.

FIG. 5 is a flowchart for word stretching identification of the emotion speech recognition application in accordance with an embodiment. In FIG. 5, at step 510 a trained model implement in a convoluted neural network is created. Alternately, a RNN is created by weighting various regions for implementing the neural network. The trained model is implement on a brand by brand basis for the vendor(s) with image regions of brand features identified in an iterative manner. The larger the training set, the more accurate the identification of image features an the brand image can become. At 520, one or more frames are extracted from broadcast live or streamed video containing a set of images for processing by the trained CNN/RNN model. At 530, the proposed regions for each image are boxed with anchors to defined bounded areas of various dimensions for classifying into foreground and background for feature extraction of features related to the object of interest. At 540, a sinoid or software function is applied to the ROIP for the brand feature identification to identify the brand and to categorize the brand. The trained model is updated and saved.

FIG. 6 schematically illustrates brand recognition system 600, which receives live video streaming content in a session such as a broadcast of live sporting event and which is depicted in accordance with an embodiment of the present disclosure. In the illustrated example, the brand recognition system 600 includes a STB streaming media server 620, a client media player or receiver 610, a display device 690, a cloud streaming video content streaming server, a brand recognition module 640 (i.e. a module configured with an image recognition application that implements a trained neural network model for classifying brands), a network cloud 650, an advertising analytics server 660 for generating brand analytics, a repository 670 for storing brand data for various customers. The brand recognition module 640 includes a machine learning (ML) and testing module 680 for training and implementing a neural network model which includes various modules a region proposal module 682, a feature extraction module 684, a training module 686, a testing module 688, a data set module 692, a neural network (CNN, R-CNN) module 694. The list of modules is merely illustrated and is contemplated that additional or different configurations of modules may be implemented as desired. The Brand recognition module 640 generates brand recognition data for analysis by the advertising analytics server 660 that generates tabular data as illustrated in FIG. 3B. The brand recognition module 640 hosted on the brand recognition server 642 may be configured separately or part of the cloud streaming media server 630. The cloud streaming media server 630 receives broadcast content from the content sources 622 of brand analysis by communications with the brand recognition server 642. The brand recognition server 642 hosting the brand recognition module 640 performs various deep learning functions such as illustrated by the various modules of the ML training and testing module 680.

In an exemplary embodiment, during operation of brand recognition system 600, communication between the cloud streaming media server 630, the STB streaming media server 620 and the client receiver device 610 occurs through a network cloud 650 as well as streamed or live broadcast video is exchanged for display on display devices 690 connected with various client receiver devices 610. The communications between each server may be over wireless or wired connections to the client receiver devices 610 which in turn outputs video (and possibly audio) signals to display devices 690.

The foregoing components (i.e. brand recognition system and module) can each be implemented utilizing any suitable number and combination of known devices including microprocessors, memories, power supplies, storage devices, interface cards, and other standard components. Such components may include or cooperate with any number of software programs or instructions designed to carry-out the various methods, process tasks, encoding and decoding algorithms, and relevant display functions described herein. The brand recognition system 600 may also contain other conventionally-known components, which are not shown in FIG. 6 to avoid unnecessarily obscuring the drawing.

During a live video broadcast session, streaming video is received by the cloud streaming media server 630 that is in communication with the brand recognition server 642 which performs brand recognition functions by the brand recognition module 640. The brand recognition module 640 identifies brand from video transmitted by the cloud streaming media server 630 transmits to the set-top box (STB) streaming server to the client receiver device 610. particular revenue model employed (if any) and regardless of whether certain channels in the bundle are provided in an interrupted manner or as a discontinuous component stream (as may occur for certain secondary channels in the bundle, as explained more fully below).

With continued reference to FIG. 6, the streaming media server 620 can assume the form of any device, system, or component suitable for obtaining content with objects of interest for brand recognition from one or more content sources 662, encoding the content utilizing one or more encoder processors under the command one or more control processor and transmitting the encoded content to client receiver devices 610 over network cloud 650.

As generically shown in FIG. 6, the various modules can be implemented utilizing software, hardware, firmware, and combinations thereof. The streaming video streams will often contain both video and audio component streams, which may be combined with other streaming data including packet identification data. Any currently-known or later-developed packetized format can be employed by streaming media sever 620 including, but not limited to, MPEG, QUICKTIME, WINDOWS MEDIA, and/or other formats suitable for transmission over communications network. In one implementation, streaming media server 620 functions as an over-the-top (OTT) server, which provides streaming video to client receiver devices 610 as a subscription-based streaming OTT linear TV service (e.g. for showing live sporting events etc.).

Client receiver devices 610 can be any device, system, player, or the like suitable for performing the processes described herein. A non-exhaustive list of such devices includes mobile phones, laptop computers, desktop computers, gaming consoles, tablets, Digital Video Recorders (DVRs), and Set-Top Boxes (STBs). When engaged in a streaming session, client receiver device 610 outputs visual signals for presentation on display device 690. Display device 690 can be integrated into client receiver 610 as a unitary system or electronic device. This may be the case when client receiver device 610 assumes the form of a mobile phone, tablet, laptop computer, or similar electronic device having a dedicated display screen. Alternatively, display device 690 can assume the form of an independent device, such as a freestanding monitor or television set, which is connected to client receiver device 610 (e.g., a gaming console, DVR, STB, or similar peripheral device) via a wired or wireless connection. Video output signals generated by client receiver device 610 may be formatted in accordance with conventionally-known standards, such as S-video, High-Definition Multimedia Interface (HDMI), Sony/Philips Display Interface Format (SPDIF), Digital Visual Interface (DVI), or IEEE 1394 standards.

Client receiver device 610 may contain a processor configured to selectively execute software instructions, in conjunction with associated memory and conventional Input/output (I/O) features. Software application can be a placeshifting application in embodiments in which streaming media server 620 assumes the form of a STB, DVR, or similar electronic device having placeshifting capabilities and, in many cases, located within the residence of an end user. In certain implementations, client receiver device 610 may be realized utilizing special-purpose hardware or software, such as the SLINGCATCHER-brand products available from Sling Media, Inc., presently located in Foster City, Calif.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the embodiments described herein are merely exemplary implementations.

The various illustrative logical blocks, modules, and circuits described in connection with the embodiments disclosed herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A method for brand recognition in broadcast video to be performed by a computing device, the method comprising:
    receiving, by a brand recognition application executing on the computing device, a broadcast video stream comprising a series of digital images each comprising a plurality of pixels contained in consecutive frames;
    automatically extracting, by the computing device, a plurality of objects of interest associated with a set of brand features from the digital images of the broadcast video stream by applying a trained brand recognition model that comprises a first neural network to each of the digital images in order to detect one or more features related to each object of interest contained in the pixels of the digital images, wherein each of the objects of interest is associated with a brand image
    formulating a table comprising each of the objects of interest extracted from the trained brand recognition model, wherein the database associates each of the objects of interest with the brand image and at least one time during the broadcast video stream that each of the one or more objects was detected to appear in the video content of the broadcast video; and
    providing the table as an output from the computing device.

2. The method of claim 1, the brand recognition application further comprising:
    performing one or more processing steps, by the brand recognition application, in implementing the trained brand recognition model comprising:
    applying a feature extraction using the first neural network, wherein the first neural network is a trained neural network comprising a convolutional neural network (CNN) to classify one or more features in the low resolution images of the broadcast video stream;
    applying a tensor mapping to each classify one or more features in a feature map; and
    applying a region proposal for one or more regions covering the object of interest in each image to define one or more bounded regions of interest.

3. The method of claim 2, further comprising:
    identifying, by the brand recognition application, a foreground and a background for each region of the one or more regions based on the feature map for feature classification of features related to the object of interest of the selected brand image.

4. The method of claim 3, further comprising:
    applying, by the brand recognition application, a region of interest pooling layer (ROIP) to obtain a fixed vector representation in each region of interest to determine an identified feature in the low resolution images related to a selected brand.

5. The method of claim 4, further comprising:
    applying, by the brand recognition application, a second neural network comprising a region convolutional neural network (R-CNN) to the region of interest to determine a location of the selected brand within one or more of the low resolution images based on a stored set of brands classified by a trained CNN for brand recognition.

6. The method of claim 5, further comprising:
    training, by the brand recognition application, the trained brand recognition model by:
    receiving a training set of one or more images in a training broadcast video stream comprising brand images with features in one or more frames associated with objects of brands; and
    tagging features in one or more brand images of brand objects received in each frame of the training broadcast video stream to create a feature set for mapping each feature into the first neural network.

7. The method of claim 6, further comprising:
    extracting one or more features using a trained CNN and applying the tensor mapping to classify each feature in the trained brand recognition model; and
    training one or more region proposal based on a set of classified features received in the training broadcast video stream.

8. The method of claim 1 wherein the database further tracks types of brands tracked, categories of brands, and number of times that each object of interest is displayed to the viewer.

9. The method of claim 1, further comprising:
    extracting images feature by feature in a live video broadcast using a trained CNN model for quantifying visual notice of object of interest in a video session.

10. A data processing system comprising a processor and a non-transitory data storage comprising computer-readable instructions that, when executed by the processor, perform an automated process comprising:
    receiving, by a brand recognition application executing on the data processing system, a broadcast video stream comprising a series of digital images each comprising a plurality of pixels contained in consecutive frames;
    automatically extracting a plurality of objects of interest associated with a set of brand features from the digital images of the broadcast video stream by applying a trained brand recognition model that comprises a first neural network to each of the digital images in order to detect one or more features related to each object of interest contained in the pixels of the digital images, wherein each of the objects of interest is associated with a brand image;

formulating a table comprising each of the objects of interest extracted from the trained brand recognition model, wherein the database associates each of the objects of interest with the brand image and at least one time during the broadcast video stream that each of the one or more objects was detected to appear in the video content of the broadcast video; and providing the table as an output from the data processing system.

11. The data processing system of claim 10, wherein the automated process further comprises:

performing one or more processing steps, by the brand recognition application, in implementing the trained brand recognition model comprising:

applying a feature extraction using the first neural network, wherein the first neural network is a trained neural network comprising a convolutional neural network (CNN) to classify one or more features in the pixels of each image;

applying a tensor mapping to each classify one or more features in a feature map; and applying a region proposal for one or more regions covering the object of interest in each image to define one or more bounded regions of interest.

12. The data processing system of claim 11, wherein the automated process further comprises:

identifying, by the brand recognition application, a foreground and a background for each region of the one or more regions based on the feature map for feature classification of features related to the object of interest of the selected brand image.

13. The data processing system of claim 12, wherein the automated process further comprises:

applying, by the brand recognition application, a region of interest pooling layer (ROIP) to obtain a fixed vector representation in each region of interest to determine an identified feature in the image related to a selected brand.

14. The data processing system of claim 13, wherein the automated process further comprises:

applying, by the brand recognition application, a second neural network to the region of interest to determine a location of the selected brand within the pixels of the image based on a stored set of brands classified by the first neural network for brand recognition, wherein the second neural network is a region convolutional neural network (R-CNN).

15. The data processing system of claim 14, wherein the automated process further comprises:

training, by the brand recognition application, the trained brand recognition model by:

receiving a training set of one or more images in a training broadcast video stream comprising brand images with features in one or more frames associated with objects of brands; and tagging features in one or more brand images of brand objects received in each frame of the training broadcast video stream to create a feature set for mapping each feature into the first neural network for producing a trained CNN.

16. The data processing system of claim 15, wherein the automated process further comprises:

extracting one or more features using the trained CNN and applying the tensor mapping to classify each feature in the trained brand recognition model; and training one or more region proposal based on a set of classified features received in the training broadcast video stream.

17. The data processing system of claim 16, wherein the automated process further comprises:

displaying, by the graphic user interface, information from the brand recognition comprising types of brands tracked, categories of brands, and number of times displayed to the viewer.

18. The data processing system of claim 10 wherein the first neural network is a convolutional neural network (CNN) configured to classify each object of interest based upon the related one or more features and wherein the brand recognition application further comprises a region convolutional neural network (R-CNN) separate from the CNN that is configured to detect varying locations of the objects of interest within the images of the broadcast video stream.

19. An automated process to be performed by a data processing system to automatically recognize brand imagery in a plurality of different broadcast television programs, the automated process comprising:

receiving, by a brand recognition application executing on the data processing system, the plurality of different broadcast television programs, wherein each broadcast television program comprises a series of digital images each comprising a plurality of pixels contained in consecutive frames;

automatically extracting a plurality of objects of interest associated with a set of brand features from the digital images of the broadcast video streams by applying a trained brand recognition model that comprises a first neural network to each of the digital images in order to detect one or more features related to each object of interest contained in the pixels of the digital images, wherein each of the objects of interest is associated with a brand image;

formulating a table comprising each of the objects of interest extracted from the trained brand recognition model, wherein the database associates each of the objects of interest with the brand image and at least one time during the broadcast video stream that each of the one or more objects was detected to appear in the video content of the broadcast video; and providing the table as an output from the data processing system.

20. The automated process of claim 19 wherein the first neural network is a convolutional neural network (CNN) configured to classify each object of interest based upon the related one or more features, and wherein the brand recognition application further comprises a region convolutional neural network (R-CNN) separate from the CNN that is configured to detect varying locations of the objects of interest within the images of the broadcast video stream.

* * * * *